US009572139B2

United States Patent
Zhu et al.

(10) Patent No.: US 9,572,139 B2
(45) Date of Patent: Feb. 14, 2017

(54) CONTENTION BASED TRANSMISSION AND COLLISION AVOIDANCE

(75) Inventors: Jianchi Zhu, Beijing (CN); Zhi Zhang, Beijing (CN); Haipeng Lei, Beijing (CN); Yuantao Zhang, Beijing (CN); Frank Frederiksen, Klarup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 27 days.

(21) Appl. No.: 14/411,467

(22) PCT Filed: Aug. 3, 2012

(86) PCT No.: PCT/CN2012/079643
§ 371 (c)(1),
(2), (4) Date: Dec. 26, 2014

(87) PCT Pub. No.: WO2014/019216
PCT Pub. Date: Feb. 6, 2014

(65) Prior Publication Data
US 2015/0327245 A1      Nov. 12, 2015

(51) Int. Cl.
*H04W 72/04* (2009.01)
*H04W 72/02* (2009.01)
(Continued)

(52) U.S. Cl.
CPC ......... *H04W 72/0413* (2013.01); *H04W 72/02* (2013.01); *H04W 72/0446* (2013.01); *H04W 72/10* (2013.01); *H04W 84/12* (2013.01)

(58) Field of Classification Search
None
See application file for complete search history.

(56) References Cited

U.S. PATENT DOCUMENTS

| 2010/0054147 | A1* | 3/2010 | Ishii | H04L 1/1671 370/252 |
| 2010/0316011 | A1* | 12/2010 | Lin | H04W 28/04 370/329 |

(Continued)

FOREIGN PATENT DOCUMENTS

| CN | 102137496 | 7/2011 |
| CN | 102333341 | 1/2012 |
| CN | 102457854 | 5/2012 |

OTHER PUBLICATIONS

International Search Report and Written Opinion received for corresponding Patent Cooperation Treaty Application No. PCT/CN2012/079643, dated May 9, 2013, 11 pages.

*Primary Examiner* — Hassan Phillips
*Assistant Examiner* — Duc Duong
(74) *Attorney, Agent, or Firm* — Squire Patton Boggs (US) LLP

(57) ABSTRACT

Communication systems may benefit from a control channel for contention based transmission and collision avoidance. For example, communication systems of the third generation partnership project (3GPP) long term evolution (LTE) and LTE-Advanced may use such control channels for contention based transmission. In particular, such control channels may be valuable with respect to LTE-based local area network (LTE-LAN). A method, according to certain embodiments, may include preparing control information for a contention based physical uplink shared channel. The method may also include transmitting and/or receiving the control information on a physical uplink control channel and a control only physical uplink shared channel, or only on the control only physical uplink shared channel.

12 Claims, 15 Drawing Sheets

(51) Int. Cl.
*H04W 72/10* (2009.01)
*H04W 84/12* (2009.01)

(56) References Cited

U.S. PATENT DOCUMENTS

| | | | |
|---|---|---|---|
| 2011/0128928 A1 | 6/2011 | Lin et al. | |
| 2011/0292895 A1* | 12/2011 | Wager | H04L 5/0007 370/329 |
| 2011/0310986 A1* | 12/2011 | Heo | H04L 5/001 375/259 |
| 2012/0069793 A1* | 3/2012 | Chung | H04L 27/2613 370/315 |
| 2013/0044711 A1* | 2/2013 | Aiba | H04L 5/001 370/329 |
| 2013/0083737 A1* | 4/2013 | Earnshaw | H04L 1/1887 370/329 |
| 2013/0242730 A1* | 9/2013 | Pelletier | H04W 28/0284 370/230 |
| 2014/0050185 A1* | 2/2014 | Hooli | H04L 5/0053 370/329 |
| 2014/0126476 A1* | 5/2014 | Kang | H04L 1/0026 370/328 |
| 2014/0177586 A1* | 6/2014 | Jang | H04L 5/0053 370/329 |
| 2014/0192843 A1* | 7/2014 | Zeng | H04B 1/713 375/135 |
| 2015/0078231 A1* | 3/2015 | Bergstrom | H04W 72/1242 370/311 |

\* cited by examiner

CONTENTION BASED TRANSMISSION AND COLLISION AVOIDANCE

RELATED APPLICATION

This application was originally filed as PCT Application No. PCT/CN2012/079643 filed Aug. 3, 2012.

BACKGROUND

Field

Communication systems may benefit from a control channel for contention based transmission. For example, communication systems of the third generation partnership project (3GPP) long term evolution (LTE) and LTE-Advanced may use such control channels for contention based transmission. In particular, such control channels may be valuable with respect to LTE-based local area network (LTE-LAN).

Description of the Related Art

There are several scenarios for local area, for example indoor hotspot as shown in 3GPP technical report (TR) 36.814, where the area is mainly composed of multiple rooms. There also exists another scenario, for example an office enterprise, where the area is large work place. Neither the deployment of pico nor home eNode B (eNB) in current 3GPP is sufficient for this office enterprise scenario.

In 3GPP LTE, contention based random access is supported for uplink (UL) access and synchronization. From a physical layer perspective, the L1 random access procedure encompasses the transmission of random access preamble and random access response. A random access channel occupies 6 resource blocks in a subframe or set of consecutive subframes reserved for random access preamble transmissions. The eNodeB is not prohibited from scheduling data in the resource blocks reserved for random access channel preamble transmission.

Here the contention based UL transmission is used for random access, not for data transmission. Fixed 6 RBs are adopted in random access which is not suitable for data transmission. Furthermore, random access grant instead of ACK/NACK (A/N) is transmitted in response to random access.

Another approach is contention based UL transmission with a common/broadcast UL grant. In this approach the eNB broadcasts the contention based resources via a common UL grant to all UEs. When UE has data to send, UE may perform contention based transmission on the contention based resources indicated by the common UL grant.

However, the collision between UEs is very large since the available contention based resources are exactly the same. Moreover, the contention based resources are given by eNB and are common for all UEs while the data requirement for each UE may vary to large extent. Only the UE knows its own accurate buffer status. Furthermore, an UL grant is still needed.

SUMMARY

According to certain embodiments, a method includes preparing control information for a contention based physical uplink shared channel. The method also includes transmitting and/or receiving the control information on a physical uplink control channel and a control only physical uplink shared channel, or only on the control only physical uplink shared channel.

In certain embodiments, a method includes configuring a prioritized resource list for each user equipment. The method also includes configuring a maximum number of resources for contention based transmission for each user equipment.

An apparatus, in certain embodiments, includes at least one processor and at least one memory including computer program code. The at least one memory and the computer program code are configured to, with the at least one processor, cause the apparatus at least to prepare control information for a contention based physical uplink shared channel. The at least one memory and the computer program code are also configured to, with the at least one processor, cause the apparatus at least to transmit and/or receive the control information on a physical uplink control channel and a control only physical uplink shared channel, or only on the control only physical uplink shared channel.

An apparatus, according to certain embodiments, includes at least one processor and at least one memory including computer program code. The at least one memory and the computer program code are configured to, with the at least one processor, cause the apparatus at least to configure a prioritized resource list for each user equipment. The at least one memory and the computer program code are also configured to, with the at least one processor, cause the apparatus at least to configure a maximum number of resources for contention based transmission for each user equipment.

According to certain embodiments, an apparatus includes preparing means for preparing control information for a contention based physical uplink shared channel. The apparatus also includes transceiving means for transmitting and/or receiving the control information on a physical uplink control channel and a control only physical uplink shared channel, or only on the control only physical uplink shared channel.

In certain embodiments, an apparatus includes configuring means for configuring a prioritized resource list for each user equipment. The apparatus also includes configuration means for configuring a maximum number of resources for contention based transmission for each user equipment.

A non-transitory computer-readable medium is, according to certain embodiments, encoded with instructions that, when executed in hardware, perform a process. The process includes preparing control information for a contention based physical uplink shared channel. The process also includes transmitting and/or receiving the control information on a physical uplink control channel and a control only physical uplink shared channel, or only on the control only physical uplink shared channel.

A non-transitory computer-readable medium is, according to certain embodiments, encoded with instructions that, when executed in hardware, perform a process. The process includes configuring a prioritized resource list for each user equipment. The process also includes configuring a maximum number of resources for contention based transmission for each user equipment.

In certain embodiments, a method includes selecting, by a user equipment, resources according to a prioritized resource list. The method also includes limiting overall resources to avoid exceeding a maximum number of resources configured by an access point.

According to certain embodiments, an apparatus includes at least one processor and at least one memory including computer program code. The at least one memory and the computer program code are configured to, with the at least one processor, cause the apparatus at least to select, by the apparatus, resources according to a prioritized resource list. The at least one memory and the computer program code are also configured to, with the at least one processor, cause the apparatus at least to limit overall resources to avoid exceeding a maximum number of resources configured by an access point.

An apparatus, according to certain embodiments, includes selecting means for selecting, by a user equipment, resources according to a prioritized resource list. The apparatus also includes limiting means for limiting overall resources to avoid exceeding a maximum number of resources configured by an access point.

A non-transitory computer-readable medium is, according to certain embodiments, encoded with instructions that, when executed in hardware, perform a process. The process includes selecting, by a user equipment, resources according to a prioritized resource list. The process also includes limiting overall resources to avoid exceeding a maximum number of resources configured by an access point.

BRIEF DESCRIPTION OF THE DRAWINGS

For proper understanding of the invention, reference should be made to the accompanying drawings, wherein.

DETAILED DESCRIPTION

Figure 1:
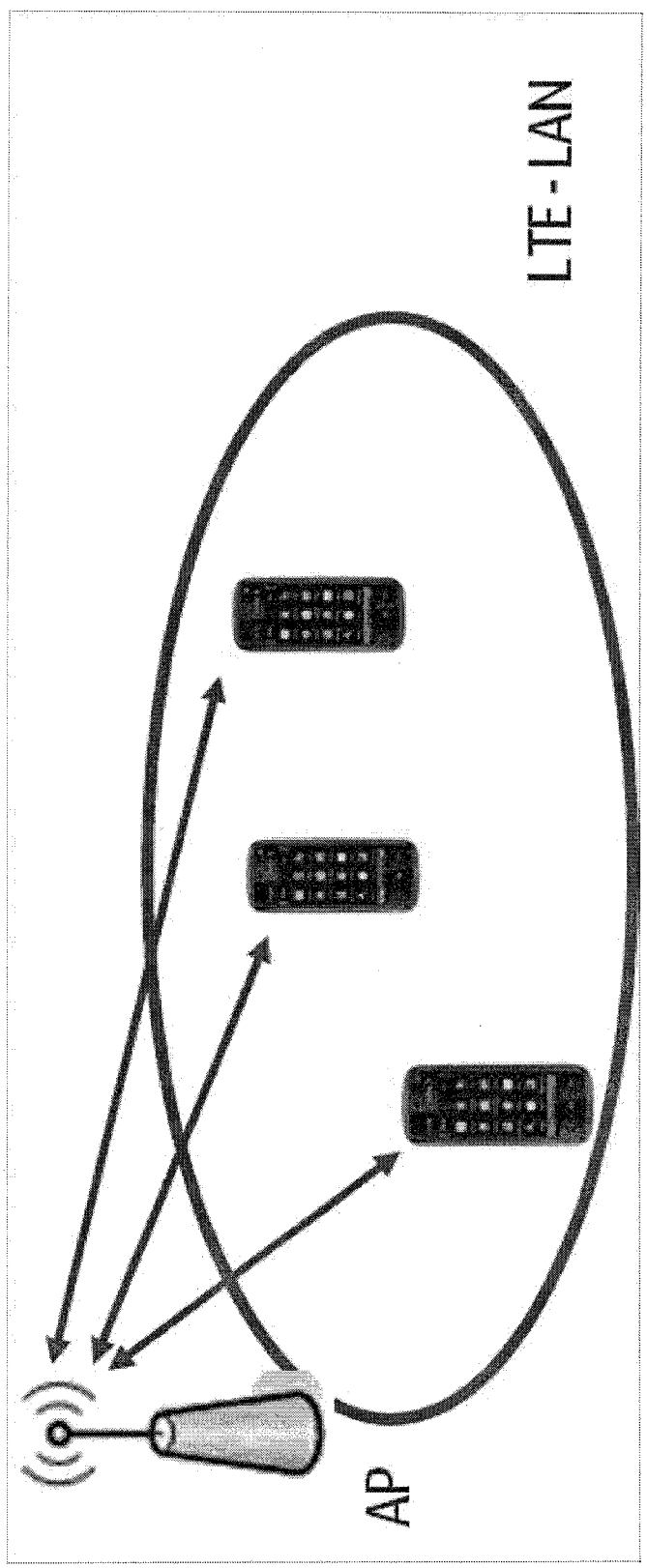
FIG. 1 illustrates an architecture of LTE-LAN.

Long term evolution local area network (LTE-LAN) may provide very high speed data transmission for local area coverage, such as indoor, residential and enterprise scenarios. FIG. 1 illustrates an architecture of LTE-LAN. The LTE-LAN access point (AP) can provide LTE-based wireless connections to local area devices. The mobile terminals working in this local area network can establish radio connections with the LTE-LAN AP.

In an LTE-based local area network, orthogonal frequency-division Multiple Access (OFDMA) may be used in uplink transmission. In LTE-LAN, uplink (UL) peak to average power ratio (PAPR) may not be an important issue due to transmission (Tx) power of the user equipment (UE) being almost equal to that of the eNode B (eNB) and UL signal to interference and noise ratio (SINR) distribution being very close to downlink (DL) SINR distribution. Besides, OFDMA for UL in local area network may have several benefits compared to single carrier frequency division multiple access (SC-FDMA), more flexible resource allocation, UL/DL similarity for device to device (D2D) case, similar UL/DL structure for interference-aware cancellation design especially for dynamic time division duplex (TDD) UL/DL configuration switching, and same radio chip applicable for both UE and LAN AP.

Therefore, certain embodiments provide for the UL control channel to be redesigned for local area network as well as UL scheduling procedure due to OFDMA applicable for UL transmission. The UE may be configured with a new UL control channel or UL signaling procedure, which may be more appropriate for a local area network.

Figure 2:
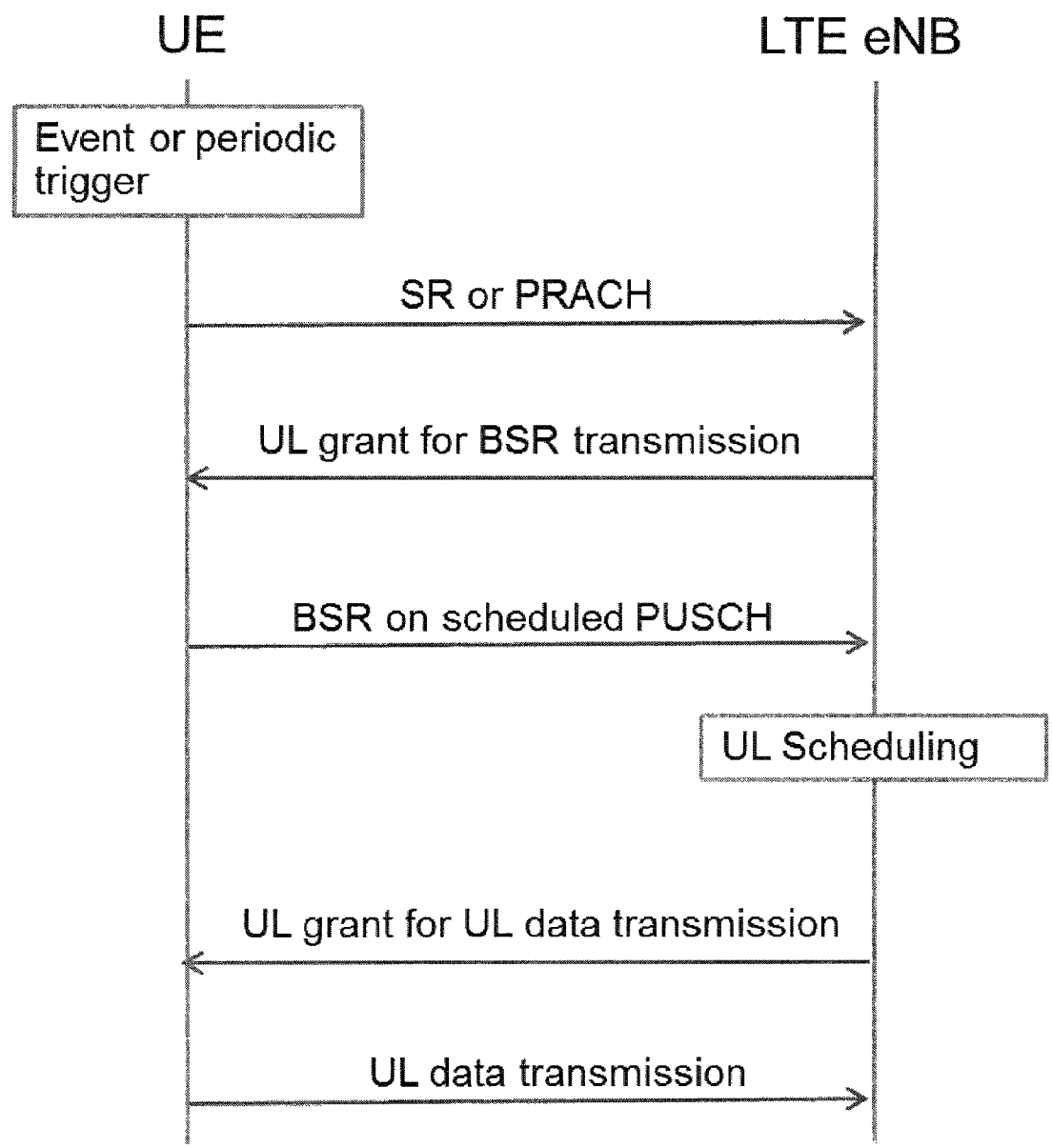
FIG. 2 illustrates contention free uplink transmission.

Uplink transmission methods may be categorized as contention-free or contention-based. Contention free UL transmission is currently adopted for data transmission in 3GPP LTE. FIG. 2 illustrates contention free uplink transmission. In detail, when a UE has uplink data available in the UE's logic buffer, it may request uplink resource for data transmission. The UE may send the scheduling request (SR) by physical uplink control channel (PUCCH) format 1 or physical random access channel (PRACH) for the contention-based uplink resource request if certain conditions for the SR are fulfilled. According to a certain scheduling policy, the eNB may allocate some physical uplink shared channel (PUSCH) resources for sending buffer status report (BSR) by means of UL grant to the UE. Then the UE may transmit the amount of data available in the logic buffer on a scheduled PUSCH to the eNB for UL scheduling. After receiving this BSR, the eNB may allocate corresponding UL resource(s) by means of an UL grant to the UE for data transmission, taking the uplink radio condition between the UE and the eNB into account. This signaling between the UE and the eNB may be complicated and may contribute to latency. TDD is a major duplexing technology in local area. Thus, sometimes the UL transmission procedures as shown in FIG. 2 will generate large latency. For example, in DL heavy TDD frame configuration is configured, for example, TDD configuration 5, the procedures in FIG. 2 may need at least 20 ms to obtain UL grant for requested UL transmission Therefore, contention based UL transmission is one method to decrease the latency. For contention based UL transmission, the scheduling request is not needed any more. Moreover, UL grant and BSR may also be saved.

In the current LTE specification, the UL data transmission is controlled by the eNB. Thus, for example, the eNB may send an UL grant to indicate to UE the resource and MCS to transmit data. However, for contention based UL data transmission, if no UL grant is sent to UE, the eNB may have no knowledge of the information, such as the resources, MCS of data transmission, and the like, that will be used by the UE. It may be hard for the eNB to detect such information. One approach to be used may be blind decoding, which means that the eNB may try every possible resource allocation and MCS combinations. Due to lack of a priori knowledge, it may be practically an impossible task for the eNB to perform such a detection.

In certain embodiments, therefore, there are various approaches for contention based transmission. For example, in certain embodiments control information for contention based physical uplink shared channel (PUSCH) may be carried on physical uplink control channel (PUCCH) and control-only PUSCH (C-PUSCH) or only in C-PUSCH.

In this embodiment, the PUCCH may contain only important and necessary information, such as an UL transmission indicator or the hybrid automatic repeat request (HARQ) process identifier (ID) of PUSCH. The eNB may configure the resources for PUCCH via RRC signaling. The PUCCH resources may be orthogonal to each other and to different UEs. C-PUSCH and contention based PUSCH may not be able to reuse the resources allocated to PUCCH. Thus, the PUCCH may be contention-free.

Figure 3:
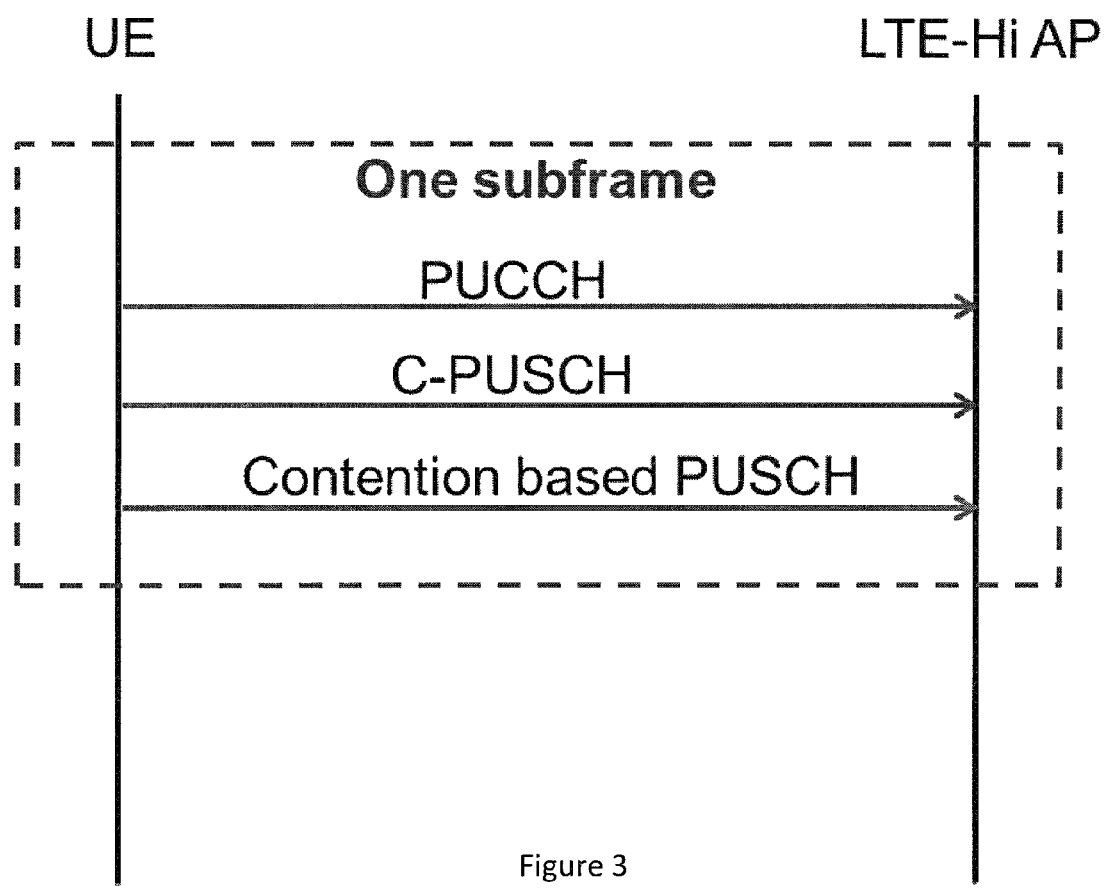
FIG. 3 illustrates contention based uplink transmission according to certain embodiments.

Likewise, in these embodiments, the C-PUSCH may contain HARQ process ID, resource allocation, modulation and code scheme (MCS), redundancy version (RV) and new data indicator (NDI) of contention based PUSCH. eNB may configure the resources for C-PUSCH via radio resource control (RRC) signaling or the resource may be implicitly derived from the prioritized resource list. The C-PUSCH resources are orthogonal between each other. Contention based PUSCH of the same UE cannot reuse the resources allocated to C-PUSCH, but contention based PUSCH of different UE may reuse the resources allocated to C-PUSCH. So C-PUSCH is partially contention based. FIG. 3 illustrates contention based uplink transmission according to certain embodiments.

Figure 4:
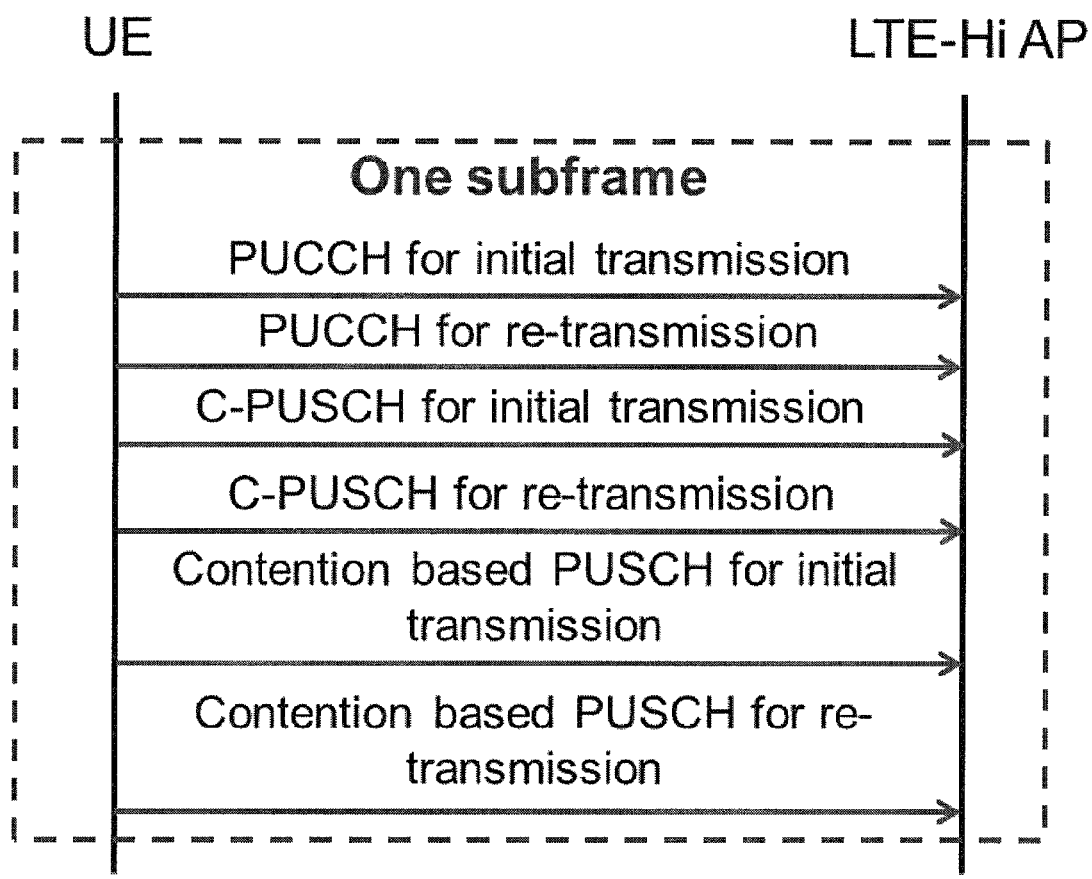
FIG. 4 illustrates multiple contention based uplink transmission according to certain embodiments.

FIG. 4, on the other hand, illustrates multiple contention based uplink transmission according to certain embodiments. Initial transmission and re-transmission may take place in one subframe, as shown in FIG. 4. In this case, multiple PUCCH, C-PUSCH and contention based PUSCH may be transmitted in the same subframe.

Moreover, in certain embodiments, in order to avoid/decrease the collision probability, the eNB may configure the prioritized resource list and the maximum number of resources for contention based transmission for each UE. Moreover, the eNB may send such information via higher layer signaling for L1 control signaling.

All the resources, excluding physical resource blocks (PRBs) for PUCCH, may be divided into several groups, and each group may be assigned one group ID. The eNB may configure, for each UE, the maximum number of resources for contention based transmission in the form of number of PRBs or number of PRB groups. The eNB may also configure the prioritized resource list, such as resource group j,k,l. The UE may select resources in the order of resource group j,k,l while ensuring that the overall resources do not exceed a maximum number of resources configured by eNB.

Methods according to such embodiments may be applicable to cases in which control information for contention based PUSCH is carried on PUCCH. Moreover, methods according to such embodiments may be applicable to cases in which control information for contention based PUSCH is carried on PUCCH and control-only PUSCH (C-PUSCH) or only in C-PUSCH.

Assuming there is a C-PUSCH, the eNB may configure the resources for C-PUSCH via RRC signaling. Alternatively, after obtaining the prioritized resources list, the UE may implicitly derive the resources for C-PUSCH, for example, the resource with the lowest PRB index of the first resource group in the prioritized resource list.

As discussed above, in certain embodiments control information for contention based PUSCH may be carried on PUCCH and control-only PUSCH (C-PUSCH) or only in C-PUSCH. All the control information for contention based transmission may be carried on PUCCH, but overhead may be significant in such a case. In order to reduce the overhead, PUCCH only may contain the minimal necessary information for contention based PUSCH, such as HARQ process ID. The other information may be contained in C-PUSCH, such as resource allocation, MCS, RV and NDI of contention based PUSCH. As illustrated in FIG. 3, the UE may transmit PUCCH, C-PUSCH and PUSCH simultaneously in one subframe.

The eNB may configure the resources for PUCCH via RRC signaling. The PUCCH resources may be orthogonal with respect to one another and to different UEs. PUCCH may contain only important and necessary information, such as an UL transmission indicator, which may be a 1 bit indication, or the HARQ process ID of contention based PUSCH.

C-PUSCH may contain HARQ process ID, resource allocation, MCS, RV and NDI, demodulation reference signal (DM-RS) ports of contention based PUSCH. The eNB may configure the resources for C-PUSCH via RRC signaling or the resource may be implicitly derived from the prioritized resource list. The C-PUSCH resources may be orthogonal to one another. C-PUSCH and contention based PUSCH cannot, in this embodiment, reuse the resources allocated to PUCCH. The modulation and coding scheme may be predefined or configured by eNB, for example quadrature phase shift keying (QPSK) with 1/3 coding rate.

The HARQ process ID may be contained in the PUCCH, and the other information may be contained in the C-PUSCH. Contention based PUSCH of the same UE cannot reuse the resources allocated to C-PUSCH, but contention based PUSCH of different UE may reuse the resources allocated to C-PUSCH.

In certain embodiments, for example, the PUCCH channel contains a UL transmission indicator. For this purpose, PUCCH Format 1 may be reused. Moreover, in certain embodiments C-PUSCH contains HARQ process ID, resource allocation, MCS, NDI, RV, and DM-RS ports.

Figure 9:
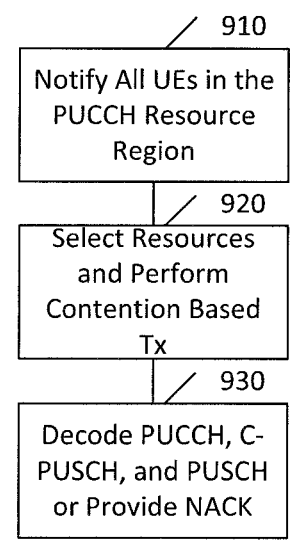
FIG. 9 illustrates a method according to certain embodiments.

FIG. 9 illustrates a method according to certain embodiments. As shown in FIG. 9, at 910, an eNB may notify all UEs in the PUCCH resource region. The eNB may configure the resource for PUCCH associated with contention based PUSCH for each UE via RRC signalling. Moreover, the eNB may configure the prioritized resource list and the maximum number of resources for contention based transmission for each UE.

Then, at 920, when the UE has data to transmit, it may select resources and MCS according to its buffer status and these information may be contained in C-PUSCH. Then UE may perform contention based PUSCH transmission on the selected resources. The resource selection may be based on the principles described above. PUCCH with UL transmission indicator, C-PUSCH and contention based PUSCH may be transmitted simultaneously.

Finally, at 930, the eNB may first decode PUCCH. If the eNB finds there is UL transmission, the eNB may try to decode C-PUSCH. After that, the eNB may decode PUSCH indicated by C-PUSCH. If eNB fails decoding PUCCH, the eNB may feedback NACK accordingly.

In another embodiment, the PUCCH channel may contain an HARQ process ID. Moreover, a C-PUSCH may contain resource allocation, MCS, NDI, RV, and DM-RS ports.

In this embodiment, as shown in FIG. 9, at 910, the eNB may notify all UEs the PUCCH resource region. The eNB may configure the resource(s) for the PUCCH associated with contention based PUSCH for each UE via RRC signaling. The eNB may configure a prioritized resource list and a maximum number of resources for contention based transmission for each UE.

At 920, when the UE has data to transmit, it may select resources and MCS according to its buffer status and the information contained in C-PUSCH. Then, the UE may perform contention based PUSCH transmission on the selected resources. The resource selection may be based on the prioritized resource list and the maximum number of resources for contention based transmission. PUCCH with HARQ process ID, C-PUSCH and contention based PUSCH may be transmitted simultaneously.

Then, at 930, the eNB may first decode PUCCH. If the eNB finds that there is an UL transmission, the eNB may try to decode C-PUSCH. After that, the eNB may decode the PUSCH indicated by the C-PUSCH. If the eNB fails to decode PUCCH, the eNB may feedback NACK accordingly.

Figure 7:
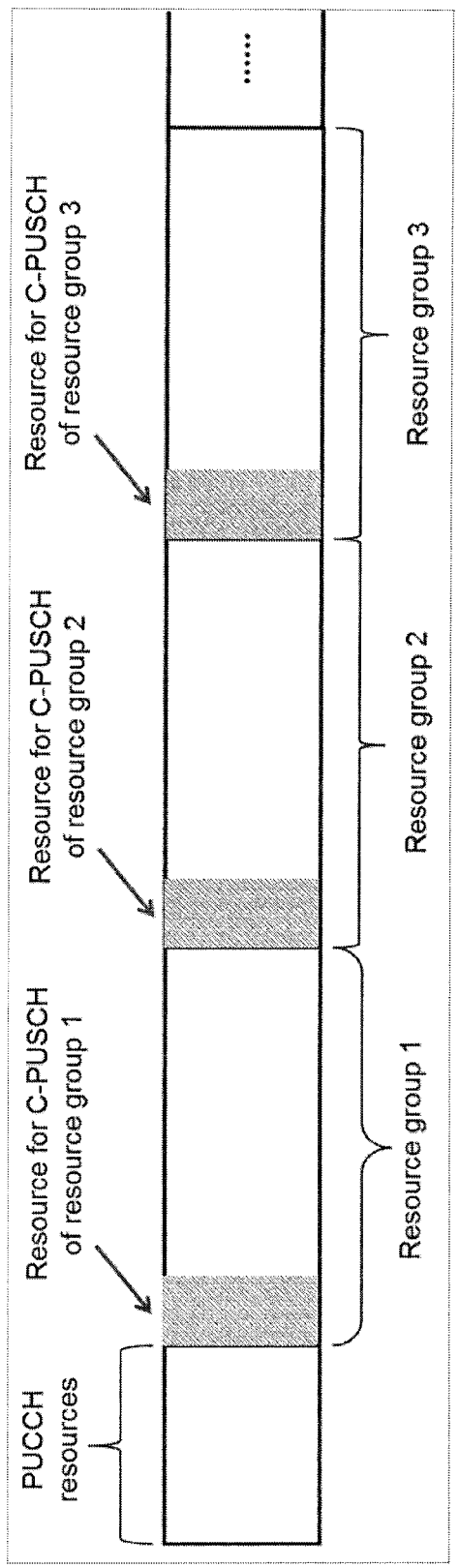
FIG. 7 illustrates resource allocation for C-PUSCH, according to certain embodiments.

In another embodiment, no PUCCH is transmitted. Thus, all the control information is transmitted in C-PUSCH. The eNB may blind decode on the resources assigned for C-PUSCH to find whether the UE has transmission, as shown in FIG. 7. In this embodiment there may be no channel corresponding to PUCCH. Moreover, the C-PUSCH may include HARQ process ID, resource allocation, MCS, NDI, RV, and DM-RS ports.

Figure 10:
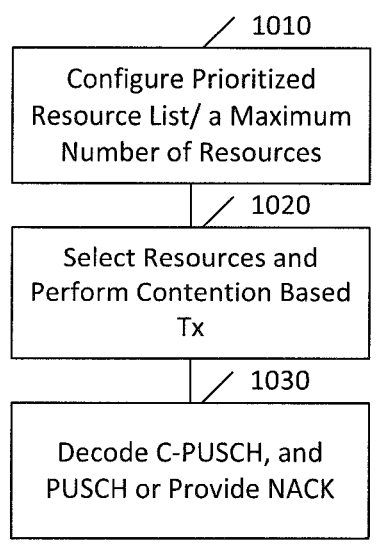
FIG. 10 illustrates another method according to certain embodiments.

FIG. 10 illustrates another method according to certain embodiments. As shown in FIG. 10, at 1010, the eNB may configure the prioritized resource list and the maximum number of resources for contention based transmission for each UE.

At 1020, when UE has data to transmit, it may select resources and MCS according to its buffer status and the information contained in C-PUSCH. Then, the UE may perform contention based PUSCH transmission on the selected resources. The resource selection may be based on the prioritized resource list and the maximum number of resources for contention based transmission. C-PUSCH and contention based PUSCH may be transmitted simultaneously.

Figure 5:
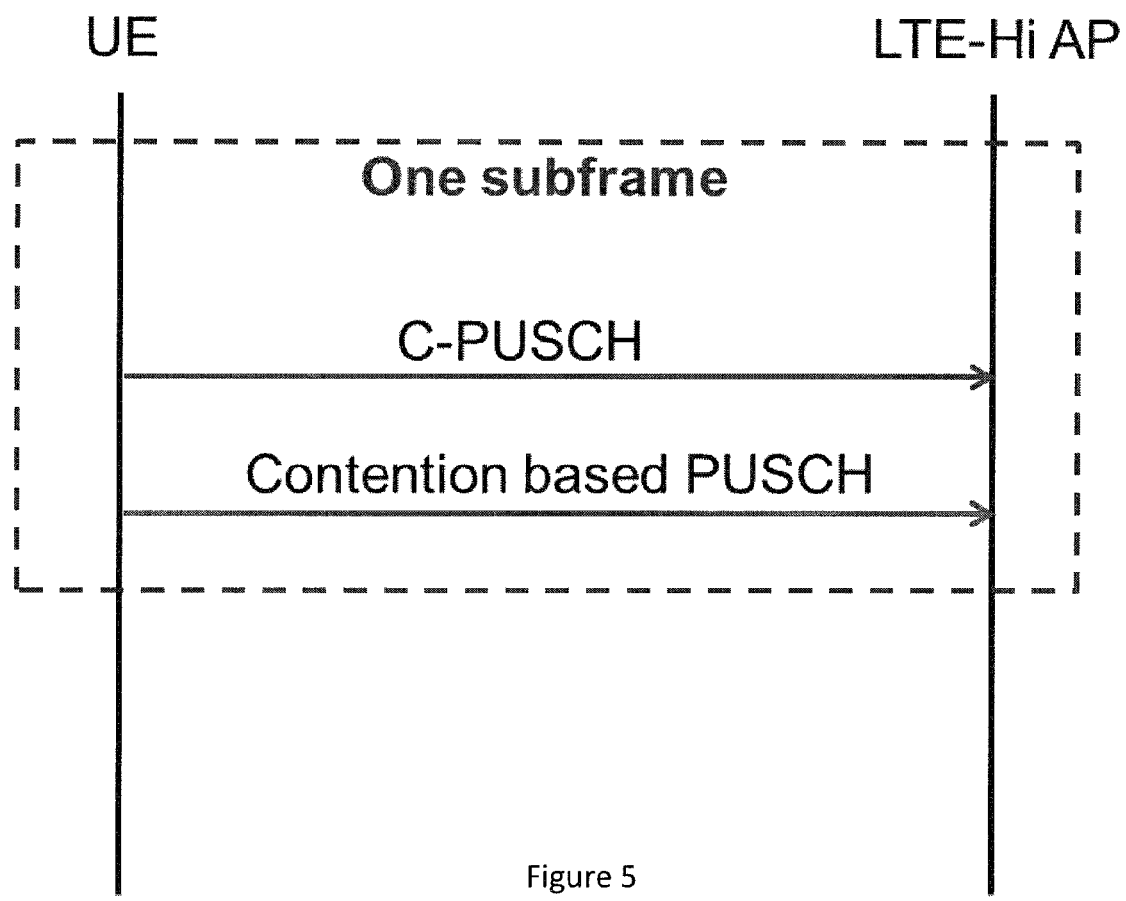
FIG. 5 illustrates contention based transmission without a channel corresponding to PUCCH, according to certain embodiments.

At 1030, the eNB may try to decode C-PUSCH. After that, the eNB may decode the PUSCH indicated by C-PUSCH. A NACK may be provided if decoding is not successful. FIG. 5 illustrates contention based transmission without a channel corresponding to PUCCH, according to certain embodiments. As shown, there may be a complete absence of PUCCH.

In certain embodiments, in order to avoid/decrease collision probability, the eNB may configure a prioritized resource list and a maximum number of resources for contention based transmission for each UE.

Figure 6:
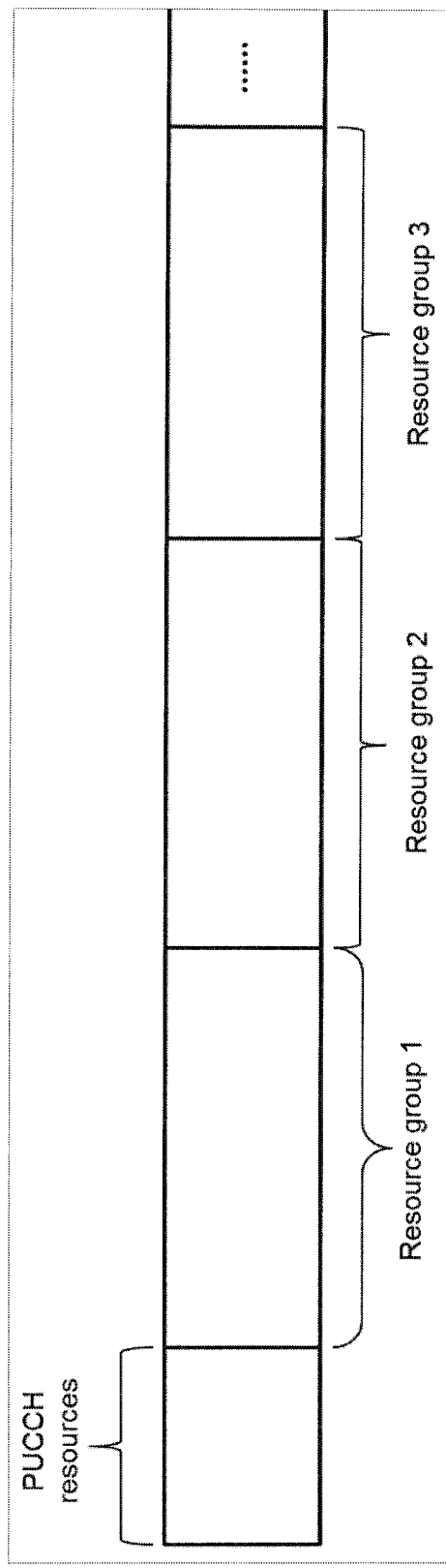
FIG. 6 illustrates resource allocation for contention based PUSCH, according to certain embodiments.

For example, the eNB may send such information via higher layer signaling or L1 control signaling. All the resources, excluding PRBs for PUCCH, may be divided into several groups and each group may be assigned one group ID. FIG. 6 illustrates resource allocation for contention based PUSCH, according to certain embodiments.

This method and similar methods may be applicable both to the case in which control information for contention based PUSCH is carrier on PUCCH and to the case in which control information for contention based PUSCH is carried on PUCCH and control-only PUSCH (C-PUSCH) or only in C-PUSCH.

The eNB may configure the resources for C-PUSCH via RRC signaling. Alternatively, after obtaining the prioritized resources list, the UE may implicitly derive the resource for C-PUSCH, for example the resource with lowest PRB index of the first resource group in the prioritized resource list. FIG. 7 illustrates resource allocation for C-PUSCH, according to certain embodiments.

Figure 8:
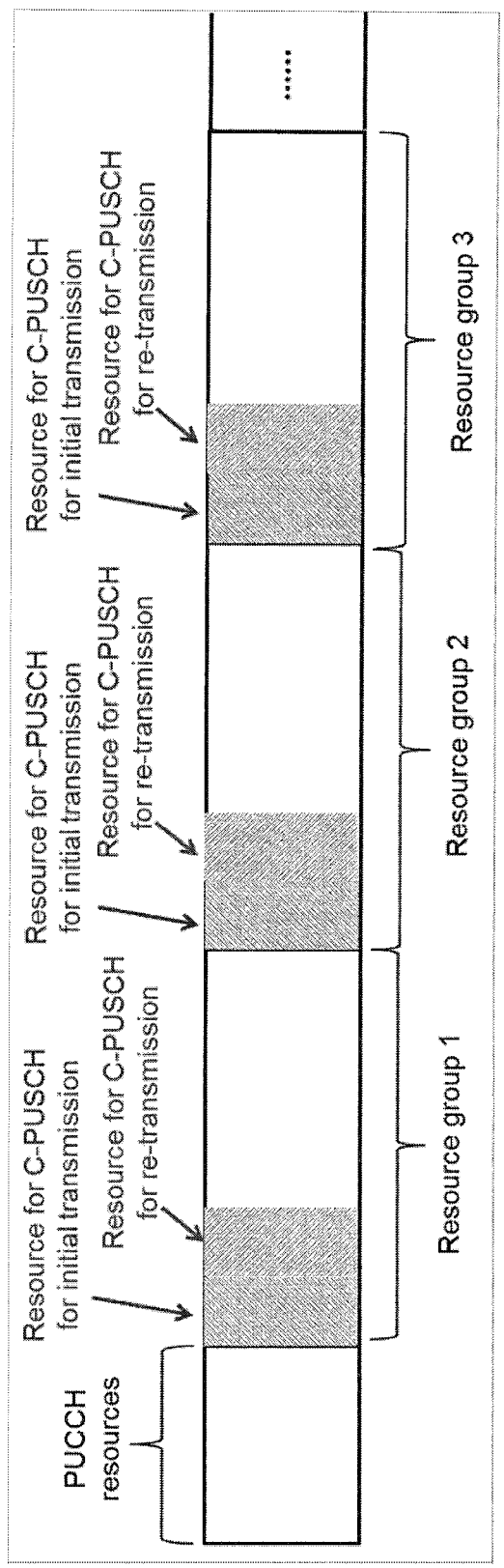
FIG. 8 illustrates resource allocation for contention based transmission with initial transmission and re-transmission, according to certain embodiments.

When initial transmission and retransmission take place in one subframe, multiple resources may be assigned to C-PUSCH to support multiple contention based PUSCH transmission, as shown in FIG. 8. In certain embodiments, therefore, eNB may notify UE the maximum number of contention based PUSCH transmission. FIG. 8 illustrates resource allocation for contention based transmission with initial transmission and re-transmission, according to certain embodiments.

In the following discussion, all the resources, for example 48 PRBs excluding PRBs for PUCCH, may be divided into 8 groups with 6 PRBs in each group. For example, eNB may configure UE based on the maximum number of resource groups for contention based transmission and the corresponding prioritized resource list as follows

| Maximum Number of Resource Groups (3 bits) | Resource Group ID: j | Resource Group ID: k | Resource Group ID: l |
|---|---|---|---|

In an another embodiment, the eNB may configure UE based on the maximum number of PRBs for contention based transmission and the corresponding prioritized resource list as follows

| Maximum Number of PRBs (6 bits) | Resource Group ID: j | Resource Group ID: k | Resource Group ID: l | Resource Group ID: m |
|---|---|---|---|---|

In yet another embodiment, the eNB may configure the orthogonal resources between UEs. For example, assuming there are three UEs, UE1 may have a maximum number of resource group value of 3, and a prioritized resource list of resource groups 1,4,8. UE2 may have a maximum number of resource group value of 2, and a prioritized resource list of resource groups 7,3. Furthermore, UE3 may have a maximum number of resource groups value of 1, and a prioritized resource list of resource group 5. It should be understood it) that this example is merely an illustration of one possible assignment of a set of maximum numbers of resource groups and one possible assignment of a set of prioritized resource lists.

In a further embodiment, the maximum number of resources is configured to zero. Thus, contention based transmission is not allowed for this UE.

The principle of the resource selection for contention based PUSCH may also be performed based on the configuration from eNB. A principle of resource selection for C-PUSCH and contention based PUSCH can be as described in FIG. 11.

Figure 11:
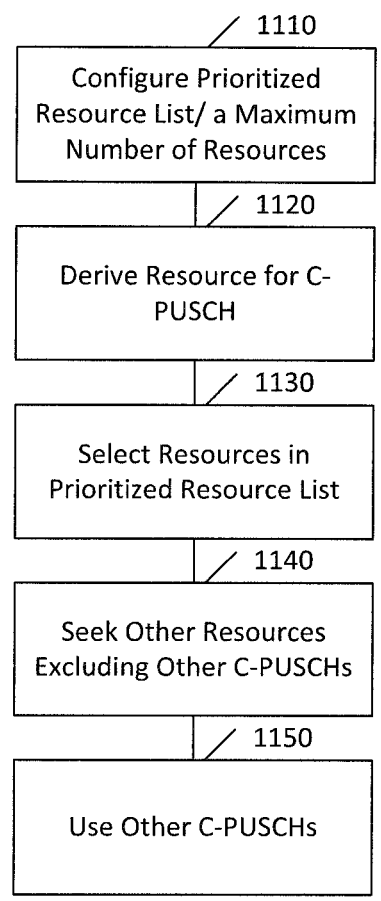
FIG. 11 illustrates a further method according to certain embodiments.

FIG. 11 illustrates a further method according to certain embodiments. As shown in FIG. 11, at 1110, an ENB may configure the maximum number of resources and the prioritized resource list to each UE. Moreover, at 1120, the UE may derive the resource for C-PUSCH from the lowest PRB index of the first resource group in the prioritized resource list.

At 1130, the UE may first select the resources in the prioritized resource list. The resources may be selected in the first resource group, then second resource group, and so on. Then, at 1140, if the resources in the prioritized resource list cannot meet the requirements, the UE may try to seek other resources which are not for C-PUSCH of other UEs, while ensuring that the overall resources do not exceed the maximum number of resources configured by eNB. If the requirements still cannot be satisfied, at 1150, the UE may select the resources used for C-PUSCH of another UE. The resources used for C-PUSCH of the same UE cannot be used. Keep the overall resources don't exceed the maximum number of resources configured by eNB.

If collision happens, the eNB may re-configure the maximum number of resources and the prioritized resource list to each UE. For example, an initial configuration may include the following: maximum number of resource group: 3; prioritized resource list: resource group 1,4,8. However, a reconfiguration may include the following: maximum number of resource group: 2; prioritized resource list: resource group 1,4. This is simply one illustrative example.

Certain embodiments may have various benefits. For example, no scheduling request and buffer statuses may be needed any more. Moreover, the downlink control signaling for UL grant may be reduced. Furthermore, the scheduling latency may be reduced.

Additionally, in certain embodiments, the PUCCH overhead for contention based transmission is low. Furthermore, the collision of contention based transmission may be reduced. Finally, resource efficiency may be improved as compared to previous approaches.

Figure 12:
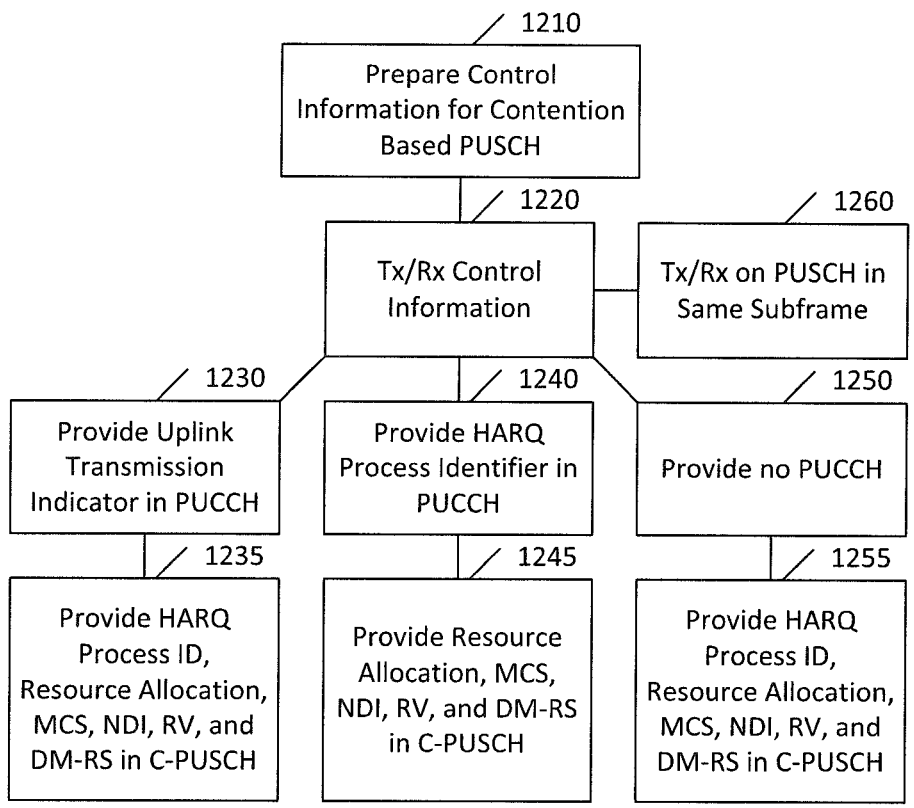
FIG. 12 illustrates a method according to certain embodiments.

FIG. 12 illustrates a method according to certain embodiments. As shown in FIG. 12, at 1210, a method may include preparing control information for a contention based physical uplink shared channel. Here, the term "preparing" may broadly refer either to deciding what the control information will be or to determining the control information decided by another network element. At 1220, the method may include transmitting and/or receiving the control information on a physical uplink control channel and a control only physical uplink shared channel, or only on the control only physical uplink shared channel.

The method may also include, at 1230, providing, in the physical uplink control channel, an uplink transmission indicator. Moreover, the method may include, at 1235, providing, in the control only physical uplink shared channel at least one of a hybrid automatic repeat request process identifier, a resource allocation, a modulation and coding scheme, a new data indicator, redundancy version, and demodulation reference signal ports.

The method may further include, at 1240, providing, in the physical uplink control channel, a hybrid automatic repeat request process identifier. The method may also include, at 1245, providing, in the control only physical uplink shared channel at least one of a resource allocation, a modulation and coding scheme, a new data indicator, redundancy version, and demodulation reference signal ports.

The method may additionally include, at 1250, providing no physical uplink control channel. Furthermore, at 1255, the method may include providing, in the control only physical uplink shared channel at least one of a hybrid automatic repeat request process identifier, a resource allocation, a modulation and coding scheme, a new data indicator, redundancy version, and demodulation reference signal ports.

At 1260, the method may further include transmitting and/or receiving on a contention based physical uplink shared channel. The transmitting on the contention based physical uplink shared channel may include transmitting in a same subframe as the transmitting the control information. Moreover, the transmitting the control information may include transmitting on a physical uplink control channel for initial transmission, a physical uplink control channel for re-transmission, a control only physical uplink shared channel for initial transmission, and a control only physical uplink shared channel for retransmission on the same subframe. The transmitting on the contention based physical uplink shared channel may include transmitting contention based physical uplink shared channel for initial transmission and contention based physical uplink shared channel for retransmission in the same subframe.

Figure 13:
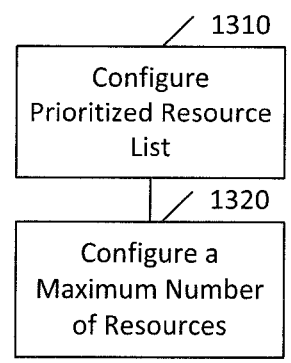
FIG. 13 illustrates yet a further method according to certain embodiments.

FIG. 13 illustrates yet a further method according to certain embodiments. As shown in FIG. 13, a method may include, at 1310, configuring a prioritized resource list for each user equipment. The method may also include, at 1320, configuring a maximum number of resources for contention based transmission for each user equipment. The configuring the maximum number of resources may include configuring a maximum number of resources groups. The configuring the maximum number of resources may, alternatively, include configuring a maximum number of physical resource blocks. In another alternative, the configuring the maximum number of resources may include configuring the maximum number of resources as zero.

Figure 14:
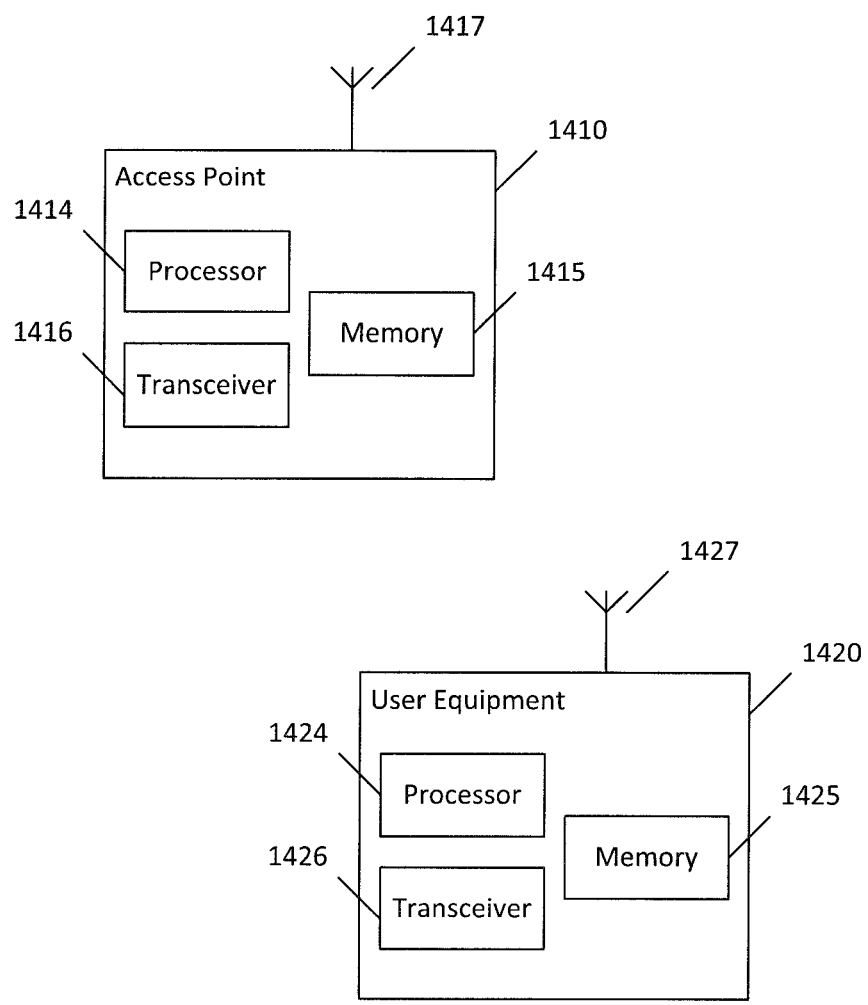
FIG. 14 illustrates a system according to certain embodiments.

FIG. 14 illustrates a system according to certain embodiments of the invention. In one embodiment, a system may comprise several devices, such as, for example, access point 1410 and UE 1420. The system may comprise more than one UE 1420 and more than one access point 1410, although only one of each is shown for the purposes of illustration. The system may also involve only at least two UEs 1420 or only at least two access points 1410. Each of these devices may comprise at least one processor, respectively indicated as 1414 and 1424. At least one memory may be provided in each device, and indicated as 1415 and 1425, respectively. The memory may comprise computer program instructions or computer code contained therein. One or more transceiver 1416 and 1426 may be provided, and each device may also comprise an antenna, respectively illustrated as 1417 and 1427. Although only one antenna each is shown, many antennas and multiple antenna elements may be provided to each of the devices. Other configurations of these devices, for example, may be provided. For example, access point 1410 and UE 1420 may be additionally configured for wired communication, in addition to wireless communication, and in such a case antennas 1417 and 1427 may illustrate any form of communication hardware, without being limited to merely an antenna.

Transceivers 1416 and 1426 may each, independently, be a transmitter, a receiver, or both a transmitter and a receiver, or a unit or device that may be configured both for transmission and reception.

Processors 1414 and 1424 may be embodied by any computational or data processing device, such as a central processing unit (CPU), application specific integrated circuit (ASIC), or comparable device. The processors may be implemented as a single controller, or a plurality of controllers or processors.

Memories 1415 and 1425 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language.

The memory and the computer program instructions may be configured, with the processor for the particular device, to cause a hardware apparatus such as access point 1410 and UE 1420, to perform any of the processes described above (see, for example, FIGS. 3-13 and 15). Therefore, in certain embodiments, a non-transitory computer-readable medium may be encoded with computer instructions that, when executed in hardware, may perform a process such as one of the processes described herein. Alternatively, certain embodiments of the invention may be performed entirely in hardware.

Furthermore, although FIG. 14 illustrates a system including an access point 1410 and a UE 1420, embodiments of the invention may be applicable to other configurations, and configurations involving additional elements, as illustrated and discussed herein. For example, multiple user equipment devices and multiple access points may be present as shown in FIG. 1, or other nodes providing similar functionality, such as relays which may receive data from an access point and forward the data to a UE and may implement both functionality of the UE and functionality of the access point.

Figure 15:
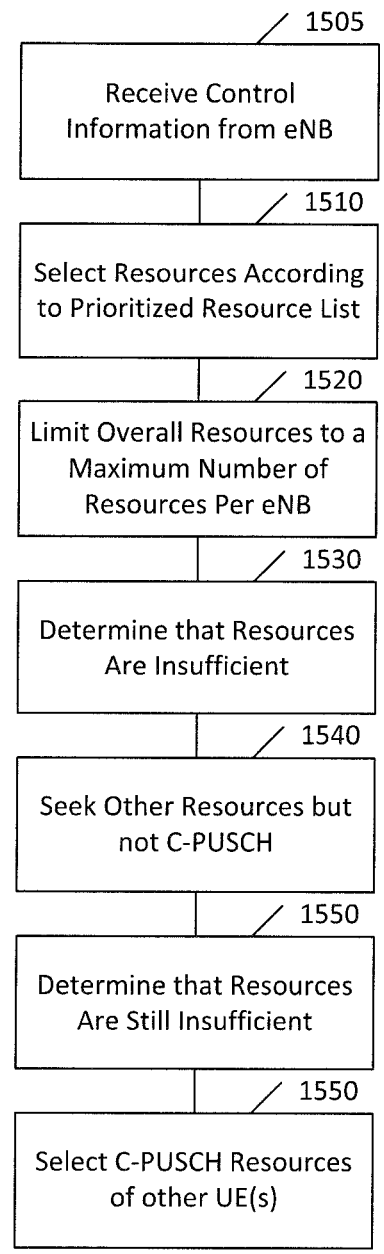
FIG. 15 illustrates a method according to certain embodiments.

FIG. 15 illustrates a method according to certain embodiments. The method of FIG. 15 may be performed by, for example, a user equipment. The method may include, at 1510, selecting, by a user equipment, resources according to a prioritized resource list. The method may also include, at 1520, limiting overall resources to avoid exceeding a maximum number of resources configured by an access point.

The selecting may include first selecting resources of a first group followed by second selecting resources of a second group, wherein the first group is designated as first by the access point. Further selection of additional groups in sequence may also be performed. The sequence may be assigned by the access point, which may be a device such as a base station or eNode B.

The method may also include, at 1530, determining that resources in the prioritized resource list are insufficient to meet a requirement. The method may further include, at 1540, seeking other resources that are not control only physical uplink shared channel resources of any other user equipment.

The method may additionally, include, at 1550, determining that other resources that are not control only physical uplink shared channel resources of any other user equipment are insufficient to meet the requirement. The method may also include, at 1560, selecting additional resources used for control only physical uplink shared channel resources.

The selecting the additional resources can exclude selecting resources used for control only physical uplink shared channel for the user equipment.

The method may further include, at 1505, receiving control information for a contention based physical uplink shared channel on a physical uplink control channel and a control only physical uplink shared channel, or only on the control only physical uplink shared channel.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

GLOSSARY

LAE Local Area Evolution
LTE-LAN LTE-Local Area Network
LA Local Area
AP Access Point
DL Downlink
UL Uplink
UE User Equipment
OFDMA Orthogonal Frequency Division Multiple Access
SC-FDMA Single Carrier Frequency Division Multiple Access
UCI Uplink Control Indicator
MCS Modulation and Coding Scheme
DCI Downlink Control Indicator
TTI Transmission Time Interval
PDCCH Physical Downlink Control Channel
PHICH Physical HARQ Indicator Channel
PCFICH Physical Control Format Indicator Channel

What is claimed is:

1. A method, comprising:
    selecting, by a user equipment, resources according to a prioritized resource list;
    limiting overall resources to avoid exceeding a maximum number of resources configured by an access point;
    determining that resources in the prioritized resource list are insufficient to meet a requirement;
    seeking other resources that are not control only physical uplink shared channel resources of any other user equipment;
    determining that other resources that are not control only physical uplink shared channel resources of any other user equipment are insufficient to meet the requirement; and
    selecting additional resources used for control only physical uplink shared channel resources.

2. The method according to claim 1, wherein the selecting the additional resources excludes selecting resources used for control only physical uplink shared channel for the user equipment.

3. A method, comprising:
    configuring a prioritized resource list for each user equipment;
    configuring a maximum number of resources for contention based transmission for each user equipment;
    receiving control information for a contention based physical uplink shared channel on a physical uplink control channel and a control only physical uplink shared channel, or only on the control only physical uplink shared channel; and
    decoding the physical uplink control channel, the control only physical uplink shared channel, and the physical uplink shared channel,
    wherein the physical uplink control channel is decoded first, the control only physical uplink shared channel is decoded second, and the physical uplink shared channel is decoded third.

4. The method according to claim 3, wherein the configuring the maximum number of resources comprises configuring a maximum number of resources groups.

5. The method according to claim 3, wherein the configuring the maximum number of resources comprises configuring a maximum number of physical resource blocks.

6. The method according to claim 3, wherein the configuring the maximum number of resources comprises configuring the maximum number of resources as zero.

7. An apparatus, comprising:
at least one processor; and
at least one memory including computer program code,
wherein the at least one memory and the computer program code are configured to, with the at least one processor, cause the apparatus at least to
select, by the apparatus, resources according to a prioritized resource list;
limit overall resources to avoid exceeding a maximum number of resources configured by an access point;
determine that resources in the prioritized resource list are insufficient to meet a requirement;
seek other resources that are not control only physical uplink shared channel resources of any other user equipment;
determine that other resources that are not control only physical uplink shared channel resources of any other user equipment are insufficient to meet the requirement; and
select additional resources used for control only physical uplink shared channel resources.

8. The apparatus according to claim 7, wherein the at least one memory and the computer program code are configured to, with the at least one processor, cause the apparatus at least to select the additional resources while excluding selecting resources used for control only physical uplink shared channel for the user equipment.

9. An apparatus, comprising:
at least one processor; and
at least one memory including computer program code,
wherein the at least one memory and the computer program code are configured to, with the at least one processor, cause the apparatus at least to
configure a prioritized resource list for each user equipment;
configure a maximum number resources for contention based transmission for each user equipment;
receive control information for a contention based physical uplink shared channel on a physical uplink control channel and a control only physical uplink shared channel, or only on the control only physical uplink shared channel; and
decode the physical uplink control channel, the control only physical uplink shared channel, and the physical uplink shared channel,
wherein the physical uplink control channel is decoded first, the control only physical uplink shared channel is decoded second, and the physical uplink shared channel is decoded third.

10. The apparatus according to claim 9, wherein the apparatus is configured to configure the maximum number of resources by configuring a maximum number of resources groups.

11. The apparatus according to claim 9, wherein the apparatus is configured to configure the maximum number of resources by configuring a maximum number of physical resource blocks.

12. The apparatus according to claim 9, wherein the apparatus is configured to configure the maximum number of resources by configuring the maximum resources as zero.

* * * * *